United States Patent
Kross

(10) Patent No.: US 7,470,726 B1
(45) Date of Patent: Dec. 30, 2008

(54) METHOD FOR CONTROLLING A HYDROGEL COMPOSITION DURING PROCESSING

(76) Inventor: Robert D. Kross, 2506 Florin Ct., Bellmore, NY (US) 11710

( * ) Notice: Subject to any disclaimer, the term of this patent is extended or adjusted under 35 U.S.C. 154(b) by 619 days.

(21) Appl. No.: 11/289,166

(22) Filed: Nov. 29, 2005

Related U.S. Application Data

(63) Continuation-in-part of application No. 10/610,323, filed on Jun. 30, 2003, now abandoned, which is a continuation-in-part of application No. 10/079,953, filed on Feb. 20, 2002, now Pat. No. 6,664,301, and a continuation-in-part of application No. 10/331,912, filed on Dec. 30, 2002, now abandoned.

(60) Provisional application No. 60/392,655, filed on Jul. 1, 2002.

(51) Int. Cl.
*C08J 3/07* (2006.01)
*B01J 13/00* (2006.01)

(52) U.S. Cl. .......................... 516/105; 516/98; 516/99; 516/924; 516/926

(58) Field of Classification Search ................. 516/105, 516/98, 99, 924, 926
See application file for complete search history.

(56) References Cited

U.S. PATENT DOCUMENTS

| | | | | |
|---|---|---|---|---|
| 4,674,511 A | * | 6/1987 | Cartmell | ..................... 600/385 |
| 4,879,072 A | * | 11/1989 | Bourset et al. | ............. 264/1.36 |
| 6,156,231 A | * | 12/2000 | McKedy | ................ 252/188.28 |

* cited by examiner

*Primary Examiner*—Timothy J. Kugel
(74) *Attorney, Agent, or Firm*—Edwin D. Schindler

(57) ABSTRACT

A method for transiently and controllably enhancing the adhesion of a hydrogel composition to select substrates for facilitating the handling of the hydrogel composition during processing, includes the steps of placing the hydrogel composition in a liquid state onto a plastic film facestock, which has biaxially-oriented polypropylene, microporous cellulose acetate or a combination thereof, for temporarily adhering the hydrogel composition to the sheets of the roll stock during processing of the hydrogel composition, and then removing the hydrogel composition from the sheets of the roll stock, after processing of the hydrogel composition is complete, without any adverse affect on the textural qualities of the hydrogel composition.

6 Claims, No Drawings

METHOD FOR CONTROLLING A HYDROGEL COMPOSITION DURING PROCESSING

CROSS-REFERENCE TO RELATED APPLICATIONS

I. Cross-Reference to Provisional Patent Application

The inventor claims domestic priority, pursuant to 35 U.S.C. § 119(e), on the basis of U.S. Provisional Patent Application No. 60/392,655, filed Jul. 1, 2002.

II. Cross-Reference to Non-Provisional Patent Applications

This is a continuation-in-part of application Ser. No. 10/610,323, filed Jun. 30, 2003, now abandoned, which is a continuation-in-part of both application Ser. No. 10/079,953, filed Feb. 20, 2002, now U.S. Pat. No. 6,664,301, the entire disclosure of which shall be deemed to be incorporated by reference herein; and, a continuation-in-part of application Ser. No. 10/331,912, filed Dec. 30, 2002, now abandoned.

BACKGROUND OF THE INVENTION

The present invention relates, generally, to methods and compositions for facilitating the processing of hydrogel materials.

More particularly, the present invention provides a method for transiently and controllably enhancing the adhesion of a hydrogel composition to sheets and roll stock, to which the poured hydrogel composition has been applied during processing, to a sufficient degree so that the hydrogel composition can be readily removed following processing with no adverse impact on its textural qualities.

The method of the present invention also works to reduce the subsequent pressure-induced flow of such hydrogel compositions during handling and die-cutting of hydrogel segments from larger sheets and rolls thereof.

In the handling, manipulating, rewinding and, particularly, in the die-cutting of hydrogel sheets, such as those taught in the inventor's prior patent, i.e., U.S. Pat. No. 6,664,301, the innate slipperiness and flexibility of the aqueous hydrogel compositions creates great difficulty in physically manipulating sheets of hydrogel compositions in an intact matter, without distorting, bending, doubling over or an attendant overall loss of control of the dimensional characteristics of the hydrogel sheets and rolls. Further, if the hydrogel sheet is intended for die-cutting, where the fabricated sheet and its release-paper covering (on one or both sides of the sheet) are impacted by a particularly-shaped die, to produce a cut section of the sheet, the very application of the die to the sheet causes the hydrogel composition to squeeze away from the point of impact before the die-cut is made. This results in an undesired and improperly shaped hydrogel piece, thinner than the original sheet, and generally distorted as the result of a full or partial resumption of the original thickness of the hydrogel once the pressure has been relieved.

Furthermore, the hydrogel compositions generally contain 85% or more of water, or water plus such other glycols as glycerin, propylene glycol and related alcohol-based molecules. The hydrogel compositions of particular reference here are those which are prepared from gellants derived from natural plant carbohydrate sources, both terrestrial and aquatic, as well as those elaborated by bacterial cultures. These include gels characterized as guars, xanthans, carrageenans, pectins, starch and starch derivatives, cellulose and cellulose derivatives, konjacs and the like. To prepare the hydrogel compositions, the powdered gellants are often dispersed in cold water or glycol, to which other components of the gel formulation are then added, followed by heating and stirring the mixture to a temperature sufficient for the complex carbohydrate gellants to "open up" so that their chains can interact, and form physico-chemical bonds, with adjacent carbohydrate chains. For this to occur, heating generally takes place at temperatures of upwards of 80° C. When homogeneity is achieved, the mixture is cooled and the gel solidifies, either as a flat sheet induced by the application of a blade positioned over a moving belt bearing the cooling gel, or by introduction of the still-liquid gel solution in shaped forms in which they subsequently cool. The gels produced as large sheets in the former technique are generally those which may benefit from the present invention. Included in the term "sheets" are hydrogel compositions which have been applied to textiles, and in which a fabric such as a scrim has been embedded. Those sheets, either during or following cooling, are generally covered with a protective coating to minimize contamination and moisture loss; the coatings generally being of a paper (cellulosic) base composition. To promote release following processing, the hydrogel sheets are often covered with a film or covering that has at least one surface coated with a natural or synthetic wax composition, the latter often being comprised of a silicone base. Often the moisture of the hydrogel composition will penetrate the paper coating and result in a "wetting" of the cellulosic paper.

The present invention is a result of a search for a method to effectively enhance the physical control of hydrogel compositions, specifically with respect to their handling, manipulation, rewinding and die-cutting. More particularly, the invention provides a method for temporarily adhering hydrogel compositions to certain substrates, during their manufacture, for facilitating the otherwise difficult handling of the hydrogel compositions during their continued processing into a final form. And, once in its final form, the hydrogel composition can be readily detached with no adverse impact on its textural qualities.

SUMMARY OF THE INVENTION

It is, therefore, an object of the present invention to provide a method for improving the handling, manipulation, rewinding and die-cutting of a hydrogel composition over procedures known to the state of the art.

It is a further object of the present invention to provide a method for permitting a transient, controllable and temporary adhesion of a hydrogel composition to certain substrates during manufacture of the hydrogel composition for facilitating the otherwise difficult handling of the hydrogel composition during processing toward a final form.

The foregoing and related objects are achieved by a method that includes the step of utilizing certain plastic film facestocks, such as, for example, biaxially-oriented polypropylene, or cellulose ester compositions, such as cellulose acetate ("CA"), during the final processing of hydrogel compositions, rather than the cellulose-based sheets conventionally used by those skilled in the art. Hydrogel compositions are generally comprised of naturally-occurring gellants and, optionally, other ingredients, such as, stabilizers, preservatives, solubilizers, inorganic salts and the like, such as those embodied in the inventor's prior patent, i.e., U.S. Pat. No. 6,664,301, the entirety of which is incorporated herein by reference, but other hydrogel compositions not so included would also be appropriate for the application of the inventive method.

Other objects and features of the present invention will become apparent when considered in view of the following detailed description of the invention, which provides certain preferred embodiments and examples of the present invention.

It should, however, be noted that the accompanying detailed description is intended to discuss and explain only certain embodiments of the claimed invention and is not intended as a means for defining the limits and scope of the invention.

DETAILED DESCRIPTION OF THE PREFERRED EMBODIMENTS

The cellulose sheets ordinarily utilized in the prior art during final processing of hydrogel compositions, as discussed above, show little adhesion to the hydrogels and lead to the handling and die-cutting problems described above. This finding is unanticipated inasmuch as cellulosic papers are carbohydrate based, similar in structure to those carbohydrates which comprise the gellants, so that some adhesion between the two similar-based materials would be expected. Alternatively, certain plastic film facestocks, such as biaxially-oriented polypropylene ("BOPP"), which are generally hydrophobic, and manifest strong adhesive tendencies to hydrogel compositions, after the hot aqueous gel mixture is poured onto these sheets and allowed to cool. Once cooled, there is considerable bonding between the hydrogel composition and the BOPP, with considerable effort being subsequently required to separate the gel from the sheet. The gel/sheet combination is now more readily adaptable to moving, without dimensional loss, and more so to die-cutting, with minimum slippage or compressive thinning of the adhered hydrogel during the process.

Other plastic sheet materials, which would be presumed to function in a similar manner, comprising related synthetic polymers, have been found to be surprisingly incapable of providing an adhesion similar to that of certain grades of BOPP. These include: films of, and nonwoven fabrics produced from, polyester alone, polyesters in combination with rayon, rayon alone (not a true synthetic polymer), and in combination with TENCEL (trademark of Courtaulds Fibers, Inc. for a cellusloic fiber a/k/a LYOCELL); vinyls; nylon; polystyrene; and non-oriented polyolefin films. In certain instances, beneficial effects have also been observed when certain coatings have been applied to plastic facestocks, which coatings can be characterized as anti-static and/or print-receptive or adhesive-receptive.

The inventor has also found, surprisingly, that although cellulose papers have little affinity for the hydrogels, and show poor adhesion and disadvantageous moisture absorption, cellulose ester compositions, such as cellulose acetate, demonstrate significant adherence to the solidified aqueous hydrogels. Such cellulose derivatives in addition also display minimum absorption of moisture from the hydrogels, and thereby offer the ability to manipulate the adhered hydrogel composition in a desired fashion during production and handling, and without undesired effects and moisture loss.

The variations possible with the present invention can be best illustrated through reference to the following Examples. These Examples and data provide a basis for understanding of the metes and bounds of the invention, and are not be taken as a limitation upon the overall scope of the present invention. Unless otherwise noted, all parts and percentages in the Examples, as well as the instant Specification and claims, are to be understood as being by weight.

Example 1

A warm and fluid hydrogel composition, prepared from konjac flour, carrageenans, and related gums, glycerin, polyethylene glycol 400, salts, water and preservative (as taught in the inventor's prior patent, i.e., U.S. Pat. No. 6,664,301) was poured onto the surface of a continuous sheet of LABEL-LYTE (registered trademark) 70-LT-447 white opaque BOPP film. The hydrogel composition was then covered with a cellulose release paper sheet and allowed to cool. Following cooling, the release paper was removed and the continuous sheet of hydrogel laminated onto the LABEL-LYTE was further cut into 2-inch×4-inch sections for individual packaging as topical cooling patches.

Example 2

The composition described in Example 1 was prepared and poured as described, but the hydrogel composition was then covered with another sheet of microporous cellulose acetate (CA). After cooling, the continuous sheet of sandwiched hydrogel was diecut into a series of face masks. The cellulose acetate sheet had less adhesion to the hydrogel than does the BOPP film. Ironically, instructions are provided with the face masks that the CA covering should be carefully removed before product use.

While only several embodiments of the present invention have been shown and described, it will be obvious to those skilled in the art that many modifications may be made to the present invention without departing from the spirit and scope thereof.

What is claimed is:

1. A method for transiently and controllably enhancing the adhesion of a hydrogel composition to select substrates for facilitating the handling of the hydrogel composition during processing, comprising the steps in the order of:

pouring the hydrogel composition in a liquid state onto sheets of a plastic film face stock comprising a member selected from the group consisting of biaxially-oriented polypropylene, microporous cellulose acetate and a combination thereof, for temporarily adhering the hydrogel composition to the sheets of the face stock during processing of the hydrogel composition; and, removing the hydrogel composition from the sheets of the face stock, after processing is complete, without adversely affecting the hydrogel composition.

2. The method for transiently and controllably enhancing the adhesion of a hydrogel composition to select substrates for facilitating the handling of the hydrogel composition during processing according claim 1, further comprising the step:

warming the hydrogel composition prior to said pouring step.

3. The method for transiently and controllably enhancing the adhesion of a hydrogel composition to select substrates for facilitating the handling of the hydrogel composition during processing according claim 2, further comprising the step of:

covering the hydrogel composition with a protective coating made of a plastic film face stock comprising a member selected from the group consisting of biaxially-oriented polypropylene, microporous cellulose acetate and combination thereof.

4. The method for transiently and controllably enhancing the adhesion of a hydrogel composition to select substrates for facilitating the handling of the hydrogel composition during processing according claim 2, further comprising the step of:

covering the hydrogel composition with a protective coating made of release paper.

5. The method for transiently and controllably enhancing the adhesion of a hydrogel composition to select substrates for facilitating the handling of the hydrogel composition during processing according claim 1, further comprising the step of:

covering the hydrogel composition with a protective coating made of a plastic film face stock comprising a member selected from the group consisting of biaxially-oriented polypropylene, microporous cellulose acetate and a combination.

6. The method for transiently and controllably enhancing the adhesion of a hydrogel composition to select substrates for facilitating the handling of the hydrogel composition during processing according claim 1, further comprising the step of:

covering the hydrogel composition with a protective coating made of release paper.

\* \* \* \* \*